(12) United States Patent
Koutyrine et al.

(10) Patent No.: US 9,330,372 B2
(45) Date of Patent: May 3, 2016

(54) GENERATING AN IMPROVED DEVELOPMENT INFRASTRUCTURE

(71) Applicants: Oleg Koutyrine, Dielheim (DE); Klaus Kopecz, Walldorf (DE)

(72) Inventors: Oleg Koutyrine, Dielheim (DE); Klaus Kopecz, Walldorf (DE)

(73) Assignee: SAP AG, Walldorf (DE)

( * ) Notice: Subject to any disclaimer, the term of this patent is extended or adjusted under 35 U.S.C. 154(b) by 308 days.

(21) Appl. No.: 13/931,317

(22) Filed: Jun. 28, 2013

(65) Prior Publication Data

US 2015/0007126 A1 Jan. 1, 2015

(51) Int. Cl.
G06F 9/44 (2006.01)
G06Q 10/08 (2012.01)

(52) U.S. Cl.
CPC . *G06Q 10/08* (2013.01); *G06F 8/10* (2013.01)

(58) Field of Classification Search
None
See application file for complete search history.

(56) References Cited

U.S. PATENT DOCUMENTS

| | | | |
|---|---|---|---|
| 5,604,824 A * | 2/1997 | Chui et al. | 382/248 |
| 6,910,204 B1 * | 6/2005 | Rossomando | 717/108 |
| 2002/0170042 A1 * | 11/2002 | Do et al. | 717/143 |
| 2005/0210382 A1 * | 9/2005 | Cascini | 715/531 |
| 2007/0124009 A1 * | 5/2007 | Bradley et al. | 700/99 |
| 2008/0313595 A1 * | 12/2008 | Boulineau et al. | 717/101 |
| 2009/0259682 A1 * | 10/2009 | Baldwin et al. | 707/103 R |
| 2009/0319312 A1 * | 12/2009 | Moerdler et al. | 705/7 |
| 2009/0326997 A1 * | 12/2009 | Becker et al. | 705/7 |
| 2010/0083215 A1 * | 4/2010 | Bogl et al. | 717/105 |
| 2011/0219354 A1 * | 9/2011 | Zhang et al. | 717/104 |
| 2011/0231317 A1 * | 9/2011 | Arsac | 705/50 |
| 2011/0314075 A1 * | 12/2011 | Boldyrev et al. | 709/201 |
| 2012/0072917 A1 * | 3/2012 | Boldyrev et al. | 718/104 |
| 2012/0123962 A2 * | 5/2012 | Brunswig et al. | 705/348 |
| 2012/0173437 A1 * | 7/2012 | Barker et al. | 705/301 |
| 2012/0226967 A1 * | 9/2012 | Oh | 715/205 |
| 2012/0253880 A1 * | 10/2012 | Kumar et al. | 705/7.27 |
| 2013/0007063 A1 * | 1/2013 | Kalra et al. | 707/796 |

* cited by examiner

*Primary Examiner* — Jue Louie
*Assistant Examiner* — Roberto E Luna
(74) *Attorney, Agent, or Firm* — Sterne, Kessler, Goldstein & Fox P.L.L.C.

(57) ABSTRACT

Disclosed herein are system, method, and computer program product embodiments for generating an optimal development infrastructure. An embodiment operates by decomposing a development process into one or more functional requirements, mapping each functional requirement of the decomposed development process to the one or more corresponding functional capabilities, and selecting one or more services operable to implement each mapped functional capability, wherein each service comprises one or more functional capabilities.

18 Claims, 4 Drawing Sheets

GENERATING AN IMPROVED DEVELOPMENT INFRASTRUCTURE

BACKGROUND

Development platforms are relied upon to meet business demands and productivity goals. Development platforms enable the implementation of development processes by providing access to authoring tools, source code repositories, and/or runtime systems that work for various programming models (e.g., C++, Java, Ruby). In designing development platforms, there may be a tradeoff between complexity in the development infrastructure and efficiency with respect to learning, utilizing, and maintaining complex development infrastructure. Inefficiency may in turn impair developer productivity.

BRIEF DESCRIPTION OF THE DRAWINGS

The accompanying drawings are incorporated herein and form a part of the specification.

In the drawings, like reference numbers generally indicate identical or similar elements. Additionally, generally, the leftmost digit(s) of a reference number identifies the drawing in which the reference number first appears.

DETAILED DESCRIPTION

Figure 1:
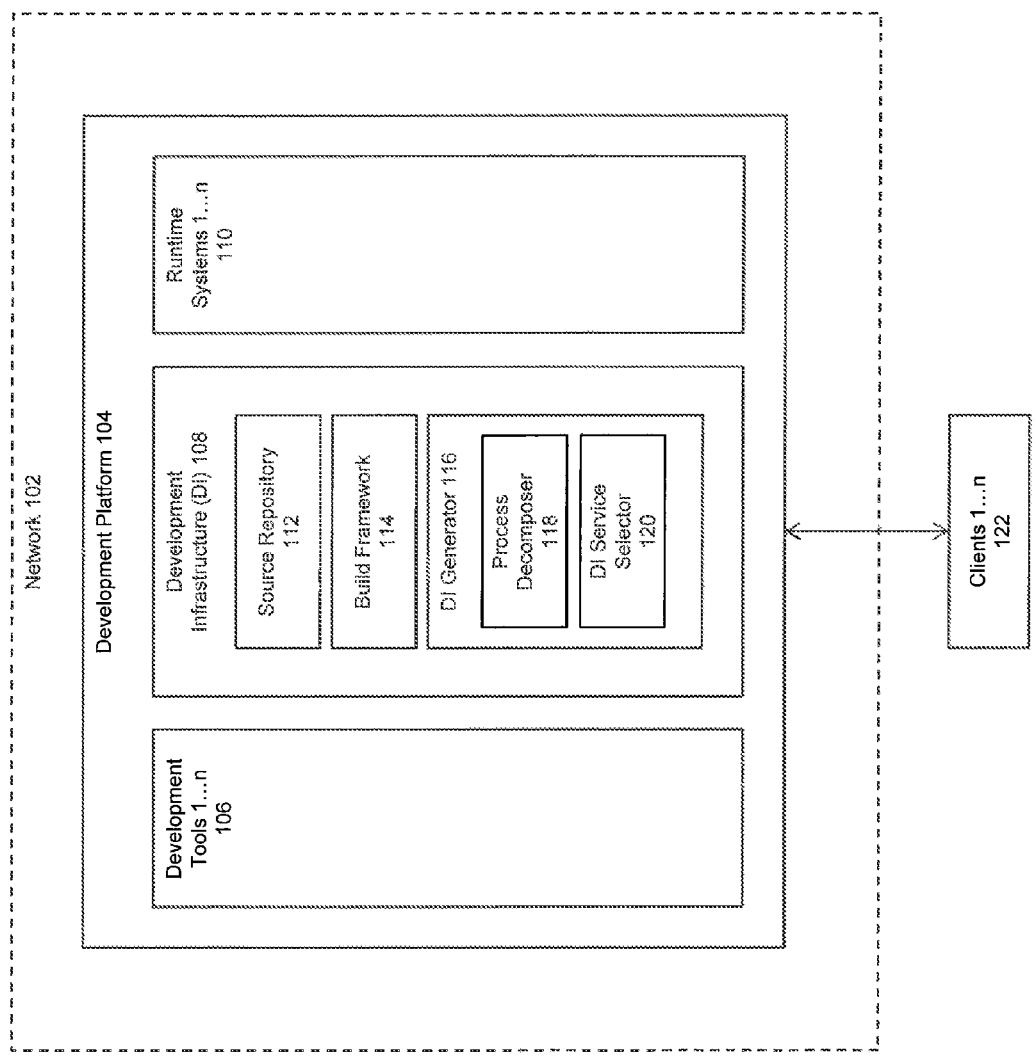
FIG. 1 is a block diagram of a system architecture for a development platform, according to an example embodiment.

Provided herein are system, method and/or computer program product embodiments, and/or combinations and sub-combinations thereof, for generating an improved or even an optimal development infrastructure.

An overall development landscape, useful to a software developer, may include development tools (e.g., for authoring and producing design artifacts), runtime systems (e.g., for qualifying software), and/or development infrastructure (e.g., for implementing development processes). Development infrastructure (DI) may deal with issues related to central storage, quality assurance, and/or other building blocks of development process implementation such as, for example, providing a source code repository (e.g., Git, SVN), providing a build manager (e.g., Maven) etc. Development infrastructure may reflect the implementation of one or more development processes. A development process may give rise to various functional requirements (e.g., require structured storage, exclusive locking on editing source files, versioning, change recording, code-line management). Functional requirements may be satisfied by services comprised of various functional capabilities. A service may include a broad variety of functional capabilities depending, for example, on the scope, purpose etc. not all of which are necessary to satisfy a functional requirement.

Also, development infrastructures can be complex. A development process may be comprised of various steps or sub-processes. Without knowing each step or sub-process, it may not be possible to assess specific functional requirements for a given development process. Complexity may be introduced by the nature of the development processes. Also, adapting variations of the same or of similar development processes implicates a range of similar or variant functional requirements. Since not all DI services satisfy all functional requirements, past approaches have been overly inclusive, blindly incorporating various functional capabilities that are not used. Problems with these past approaches include introducing unnecessary complexity which may result in inefficiency (e.g., prevent reuse of similar or common pre-existing solutions, increase the difficulty and/or cost of use, implementation, maintenance etc.). These problems increase learning barriers for developers, increase the amount of effort required to implement development processes, and/or may otherwise impair developer productivity by increasing the overall difficulty of maintaining such development infrastructures. What is needed is a way to match specific functional requirements for a development process to specific functional capabilities and their associated services.

In an example embodiment, a system, method, and computer program product are provided for decomposing a development process into one or more sub-processes. Functional requirements associated with each sub-process may be identified. Functional requirements may correspond to one or more functional capabilities. Functional capabilities are associated with development infrastructure services. By decomposing a larger, overall development process into a more granular series of sub-processes and determining requirements for each sub-process, it is possible to precisely identify a corresponding capability needed and narrowly tailor a selection of services to minimize unnecessary complexity in development infrastructure.

By way of example not of limitation, in some cases it may be optimal to select one or more broad services that support a wide range of capabilities (herein, use of optimal includes improved but sub-optimal solutions and/or approaches). For example, this may be optimal when a development process is generic, common, basic, standardized etc. and a service, or set of services, is already tailored to meet each of its requirements (e.g., off the shelf solution). In other cases, it may be optimal to select a series of targeted services that match each requirement by providing capabilities to address particular requirements (e.g., one-to-one). In other cases, a combination of both approaches may be optimal. The latter may require determining which of a set of services satisfies each requirement but minimizes a quantity of unnecessary or unmatched functional capabilities associated with each service. Unnecessary functional capabilities may increase complexity.

In an example embodiment, DI services that satisfy all or selected functional requirements are identified. This is achieved by mapping functional requirements to one or more functional capabilities. It is also possible to differentiate between individual DI services and to minimize unnecessary complexity by selecting a set, or combination, of DI services that minimizes unnecessary functional capabilities. It is also possible to select an optimal set of DI services from among various sets of DI services, such that the selected set of DI services includes the least unnecessary functional capabilities while still meeting all functional requirements. Catalogs of development processes and DI services may be employed.

FIG. 1 shows an example system architecture 100 associated with a development platform 104. Development platform 104 may be connected to one or more clients 1 ... n 122 over a network 102. One or more developer users of clients 122 may interact with development platform 104 to develop, implement, test, release, and/or maintain any type of programming work product (e.g., software, software modules, code etc.). A person having skill in the relevant art(s) would appreciate that development platform 104 is not limited to a particular kind of software development but may include, for example, the development of software as a service, development of applications configured to operate in a web browser, mobile operating system, mobile browser etc.

In an example embodiment, development platform 104 includes one or more development tools 1 . . . n 106, a development infrastructure (DI) 108, and one or more runtime systems 1 . . . n 110. Development infrastructure 108 includes a source repository 112, a build framework 114, and/or a DI generator 116. Source repository 112 may be a file archive and/or hosting facility where source code may be stored. Build framework 114 may manage development using a project object model (POM), or other paradigm, to provide a uniform build system. Build framework 114 allows development to be managed among a plurality of clients 1 . . . n 122. DI generator 116 may include a process decomposer 118 and/or a DI service selector 120, each of which will be described in the context of FIG. 2.

Figure 2:
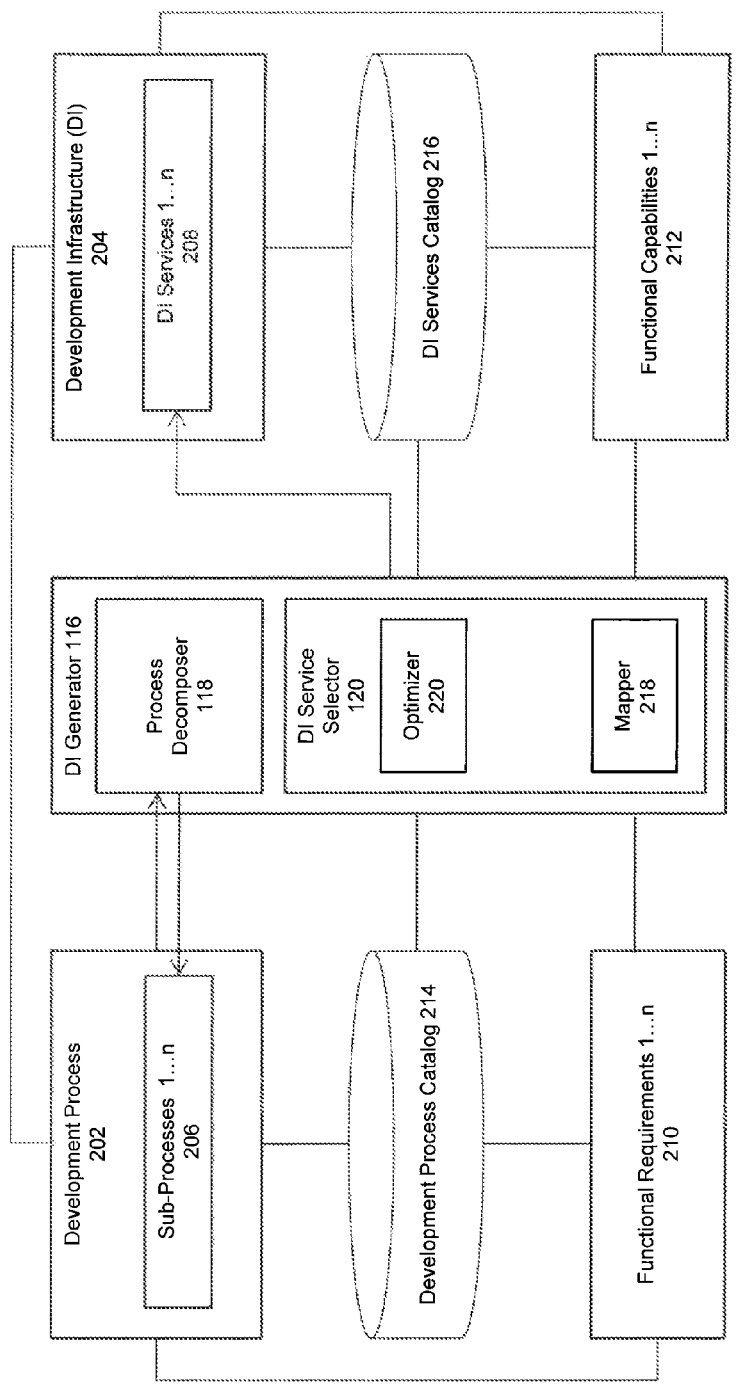
FIG. 2 is a block diagram showing a development platform and an expanded view of a development infrastructure generator, according to an example embodiment.

FIG. 2 shows an expanded view of DI generator 116, process decomposer 118, and DI service selector 120. In an example embodiment, DI service selector 120 includes a mapper 218 and an optimizer 220. As shown in FIG. 2, a development process 202 may be decomposed by process decomposer 118 into one or more sub-processes 1 . . . n 206. For example, development process 202 may be divisible into discrete functional sub-parts or sub-processes 1 . . . n 206 (e.g., process steps). Each sub-process 206 may implicate one or more functional requirements 1 . . . n 210. A functional requirement 210 corresponds to one or more functional capabilities 1 . . . n 212. In a non-limiting example, a sub-process may require creating versions of a source file (i.e., the functional requirement being creating versions of a source file), which in turn may implicate the functional capability of source versioning. Other non-limiting examples of functional requirements and corresponding functional capabilities include requiring storing source files in folder-file hierarchies and the capability of structured storage, requiring a way to get information about content in a repository and the capability of browsing files, requiring the ability to register changes of content from a base-line state and the capability of change recording, requiring managing different code-lines in the form of branching and the capability of release management, requiring tagging or labeling states of software for release and the capability of release management, etc. A person having skill in the relevant art(s) would appreciate that such functional capabilities may satisfy more than one functional requirement and may also be extended to any function capable of being provided on development platform 104.

In an example embodiment, functional capability 212 may be associated with one or more DI services 1 . . . n 208 and DI service 208 is comprised of one or more functional capabilities 1 . . . n 212. DI service 208 is the selectable unit incorporated into development infrastructure 204, as shown in FIG. 2. Selection of a set of DI services 1 . . . n 208 depends upon a mapping of functional requirements 1 . . . n 210 to functional capabilities 1 . . . n 212 and an optimization of the selection of associated DI services 1 . . . n 208. Mapping one or more functional requirements 1 . . . n 210 for a given development process 202 to one or more functional capabilities 1 . . . n 212 is performed by mapper 218. Optimization of the selection of DI services 1 . . . n 208 to a set that minimizes complexity while satisfying all of functional requirements 1 . . . n 210 is performed by optimizer 220.

In an example embodiment, mapper 218 scans a DI services catalog 216 in order to determine which DI services include target functional capabilities 1 . . . n 212. More than a single DI service may include one or more target functional capabilities 1 . . . n 212. DI services catalog 216 may be queried to provide additional information regarding each DI service, allowing for a decision to be made between two or more DI services (e.g., given that each DI service may satisfy one or more target functional capabilities 1 . . . n 212).

In an example embodiment, optimizer 220 executes a query against the cataloged entry stored in DI services catalog 216 in order to determine the number of other unique functional capabilities that are also not part of target functional capabilities 1 . . . n 212. In this manner, optimizer 220 determines a measure or quantity of unnecessary functional capabilities based on indexing and scoring which of target functional capabilities 1 . . . n 212 (e.g., associated with one or more target functional requirements 1 . . . n 210) will be satisfied by each DI service relative to unnecessary functional capabilities. Optimizer 220 calculates such a score for each DI service and generates combinations of different DI services and/or variants thereof. Optimizer 220 totals the score of each set of DI services to generate a ranking of DI service sets that provide all target functional capabilities 1 . . . n 212 while minimizing the amount or quantity of unnecessary functional capabilities. Once ranked, the optimal set of one or more DI services 1 . . . n 208 is selected and incorporated into development infrastructure 204 for implementation of development process 202.

In an example embodiment, a development process catalog 214 provides an index of standardized sub-processes 1 . . . n 206 and functional requirements 1 . . . n 210. Standard designation for each unique sub-process 206 and each unique functional requirement 210 may be indexed in development process catalog 214 in association with one or more keys, terms, semantic descriptions, etc. In a non-limiting example, sub-process 206 may refer to a standard catalog entry for "share work" associated with the semantic "publish changed source code to the team." Such a standardized entry in development process catalog 214 may be cross-indexed with functional requirement 210 which encodes (e.g., for mapper 218 to identify) "requiring the ability to share/publish work" or some other corresponding input. In this manner, development process catalog 214 provides a uniform vocabulary for associating sub-processes 1 . . . n 206 with pre-configured, encoded, and/or semantically defined functional requirements 1 . . . n 210. Development process catalog 214 may include known development processes thereby effectively describing development processes as well as sub-processes 1 . . . n 206. Utilizing development process catalog 214 enables the integration of development process 202 decomposition with the operation of mapper 218.

By way of a non-limiting example, development process 202 is comprised of standard sub-processes 1 . . . n 206 which may be recognized by process decomposer 118 to map directly to one or more entries in development process catalog 214. Similarly, entries in DI services catalog 216 may also be cross-indexed with standard functional capabilities 1 . . . n 212 which encode a range of inputs. In this manner, DI services catalog 216 may provide a standard vocabulary for associating DI services directly with pre-determined, encoded, and/or semantically defined functional capabilities 1 . . . n 212. Direct association by cataloging, whether in development process catalog 214 or DI services catalog 216, may be pre-configured and/or annotated on the fly. Catalogs may evolve as standards for development infrastructure evolve and/or require extension.

In an example embodiment, source control management (SCM) represents a DI service operable to implement standard functional capabilities including, but not limited to, browsing of source files (e.g., providing a way to access information regarding content stored in a repository), structured storage (e.g., enabling storage of sources files in folder and/or file hierarchies), source versioning (e.g., creation, deletion, maintaining different versions of a source file), change recording (e.g., enabling registration of changes made to content from a baseline, enabling denoting lifecycles for changes), code-line management (e.g., enabling isolation of code-lines, code-line management in the form of branching), release management (e.g., tagging or labeling as ready to distribute to customers) etc. In the preceding example embodiment, standardized functional capabilities may be provided which may employ a unified vocabulary and/or semantic structure. Standardization may enable the direct integration of development process 202, which dictates each functional requirement 210 that is mapped to each functional capability 212, and development infrastructure 204, which implements development process 202 using DI services 1 ... n 208 as selected based on an optimization of matched functional capabilities and narrowly tailored services.

Figure 3:
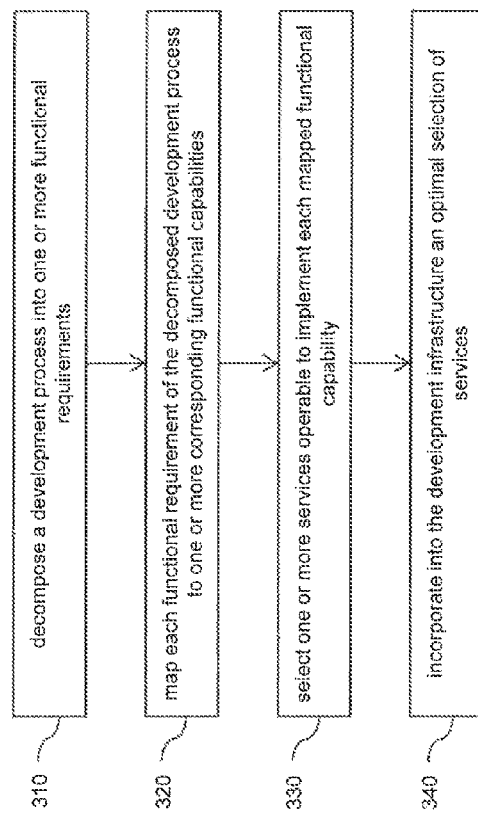
FIG. 3 is a flowchart illustrating a process for generating an improved development infrastructure, according to an example embodiment.

FIG. 3 is a flow diagram of a method for generating an optimal development infrastructure, according to an example embodiment.

Method 300 begins at step 310, where a development process is decomposed into one or more functional requirements. In an example embodiment, in step 310, process decomposer 118 decomposes development process 202 into sub-processes 1 ... n 206. In this manner, sub-processes 1 ... n 206, associated with each development process 202, are identified. Sub-process 206 may include a step, phase, period, or any other divisible unit of a development process. As shown in FIG. 2, process decomposer 118 receives as input development process 202 and outputs sub-processes 1 ... n 206. By way of a non-limiting example, process decomposer 118 may be a parser or other operational unit configured to identify breaks, transitions, and/or natural divisions within development process 202 and may be configured to determine into what constituent parts to divide up development 202 (e.g., into sub-processes 1 ... n 206). Sub-processes 1 ... n 206 may include further sub-divisions and are not limited to a single series, sub-set, or other direct division. By way of non-limiting example, sub-processes 1 ... n 206 may represent a nested and/or hierarchical division of development process 202 into phases comprised of sub-phases and further sub-phases, steps comprised of sub-steps and further sub-steps etc. Each sub-process 206 may implicate one or more functional requirements 1 ... n 210. A functional requirement 210 may correspond to one or more functional capabilities 1 ... n 212. A person having skill in the relevant art(s) would appreciate that such functional capabilities may satisfy more than one functional requirement and may also be extended to any function capable of being provided on development platform 104.

In an example embodiment, in step 310, each sub-process 206 may be mapped to a corresponding entry in a development process catalog, each entry in the development process catalog defined by one or more functional requirements. As shown in FIG. 2, sub-processes 1 ... n 206 are connected to development process catalog 214 which is connected to one or more functional requirements 1 ... n 210. Functional requirements 1 ... n 210 may be comprised of a data structure associated with storage on development platform 104. In an example embodiment, in step 310, development process catalog 314 comprises one or more indices of standardized development sub-processes, the indices including a cross-reference to functional requirements 1 ... n 210. The linking of functional requirements 1 ... n 210 and sub-processes 1 ... n 206 to development process catalog 214 enables mapping to standardized functional requirements which may be defined, annotated, associated with metadata etc. to allow for various encoded and/or semantic associations. By way of non-limiting example, standardized functional requirements may capture best-practices, logic, or other forms of configuration capable of facilitating the matching of sub-processes 1 ... n 206 to corresponding functional requirements 1 ... n 210.

In an example embodiment, in step 320, each functional requirement 210 of the decomposed development process 202 is mapped to one or more functional capabilities 1 ... n 212. A functional requirement may be found to correspond to a functional capability if, for example, the functional requirement is satisfied by the functional capability. In an example embodiment, mapper 218 searches for functional capabilities 1 ... n 212 which satisfy each target functional requirement 210. If a corresponding functional capability 212 is identified, its location is stored by mapper 218 for recall.

In an example embodiment, in step 320, each functional capability 212 is mapped to one or more corresponding services in a DI services catalog, each entry in DI services catalog 216 defined by one or more functional capabilities 1 ... n 212. DI services may be defined by attributes other than target functional capabilities 1 ... n 212 including, but not limited to, source, specification, scope, permissions etc. Mapping one or more functional requirements 1 ... n 210 for a given development process 202 to one or more functional capabilities 1 ... n 212 is performed by mapper 218.

In an example embodiment, functional capabilities 1 ... n 212 are connected to DI services catalog 216 which is connected to one or more DI services 1 ... n 208. Functional capabilities 1 ... n 212 may exist as a data structure associated with storage on development platform 104. DI services catalog 216 comprises one or more indices of standardized functional capabilities, the indices including a cross-reference to one or more services. Linking of functional capabilities 1 ... n 212 to DI services catalog 216 enables mapping in terms of standardized functional capabilities which may be defined, annotated, associated with metadata etc. to allow for a range of encoded and semantic associations. By way of a non-limiting example, standardized functional capabilities may capture best-practices, logic, or other forms of configuration capable of facilitating the matching of functional capabilities 1 ... n 212 to services. In an example embodiment, mapper 218 scans DI services catalog 216 for one or more corresponding functional capabilities 1 ... n 212. DI services catalog 216 indexes, cross-indexes, and/or associates each functional capability 212 with one or more services. Upon identifying a matching functional capability 212 in DI services catalog 216, mapper 218 identifies each service associated with the target functional capability 212. A service may be operable to implement any functional capability 212 with which it is associated. By way of example not of limitation, DI services catalog 216 utilizes a unified vocabulary scheme.

In an example embodiment, in step 330, services operable to implement each mapped functional capability are selected. A service may be comprised of one or more functional capabilities. A service may contain a number of functional capabilities which do not implement any target functional capability 212. By way of a non-limiting example, a service may contain functional capabilities that were not identified by mapper 218 as corresponding to one or more of functional requirements 1 ... n 210. A service may thus be comprised of both matched functional capabilities 1 ... n 212 and unmatched functional capabilities. Optimization is performed on the selection of DI services 1 ... n 208 in order to select a set that minimizes complexity while satisfying all of functional requirements 1 . . . n 210. Such optimization is performed by optimizer 220.

In an example embodiment, optimizer 220 executes a query against the cataloged entry stored in D services catalog 216 to determine functional capabilities not matched to at least one of target functional capabilities 1 . . . n 212. Optimizer 220 thereby determines a measure or quantity of unnecessary functional capabilities based on indexing and scoring which of target functional capabilities 1 . . . n 212 (e.g., associated with one or more target functional requirements 1 . . . n 210) is satisfied by each DI service relative to unnecessary functional capabilities. Optimizer 220 calculates a score for each DI service and generates combinations of different DI services and/or variants thereof for which overall scores are generated. Optimizer 220 totals the score of each set of DI services to generate a ranking of DI service sets operable to implement all of the target functional capabilities 1 . . . n 212 while minimizing the quantity of unnecessary functional capabilities. Once ranked, the optimal set of DI services 1 . . . n 208 may be selected.

In an example embodiment, selecting includes determining a first value for a first set of one or more services based on a quantity of functional capabilities satisfying each functional requirement relative to a quantity of functional capabilities not satisfying any functional requirement. Selecting may then include determining an Nth value for a next Nth set of services based on a quantity of functional capabilities satisfying each functional requirement relative to a quantity of functional capabilities not satisfying any functional requirement. Selecting may then include ranking the first value through the Nth value by which set of services minimizes a total quantity of functional capabilities not associated with any functional requirement while still satisfying each functional requirement. In this manner, the set of one or more services that minimizes the total quantity of functional capabilities not associated with any functional requirement while still satisfying each functional requirement may be selected.

In an example embodiment, in step 340, an optimal selection of services is incorporated into the development infrastructure. Development infrastructure 204 is thus generated to be comprised of the optimal selection of DI services 1 . . . n 208. DI services 1 . . . n 208 is the set of one or more services determined to minimize the total quantity of functional capabilities not associated with any functional requirement while satisfying each functional requirement may be selected. Reducing the overall quantity of functional capabilities to the set of DI services optimally associated with functional requirements 1 . . . n 210 in turn generates development infrastructure 204 with a minimal amount of unnecessary functional capabilities.

In an example embodiment, "cloud" infrastructures instantiate virtual computing resources together with software. For example, a Linux equipped computer environment may be instantiated on cloud infrastructure. In the same or a similar manner, DI services may be instantiated. Such DI services may be pre-configured and/or may be instantiated following selection and optimization. DI services catalog 216 may be assigned a set of one or more images deployed to a virtual machine to instantiate a DI service. Such images may encode hardware and/or software operable to implement the DI service. In this way, an optimal selection of services may be incorporated into the development infrastructure.

Example Computer System

Figure 4:
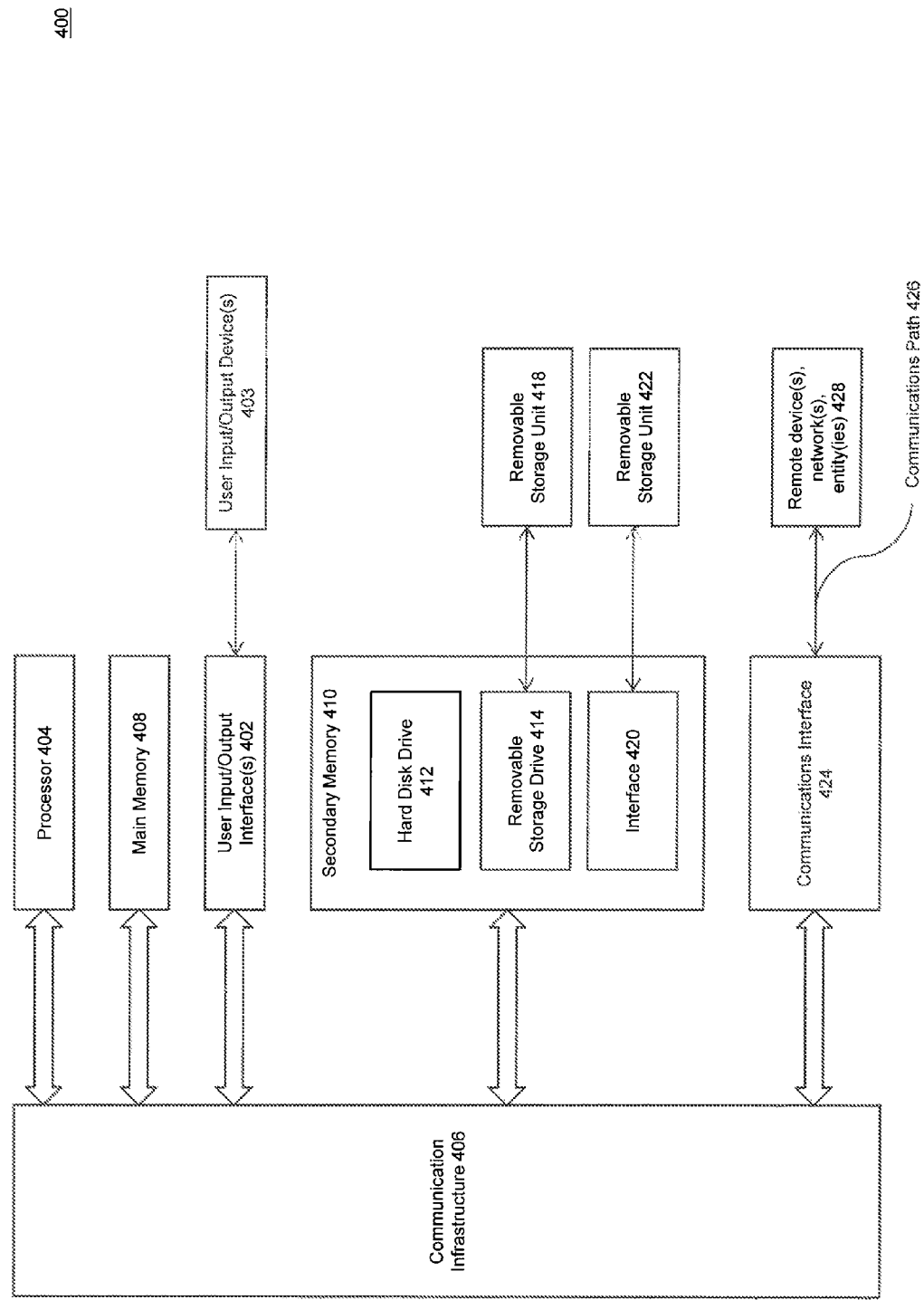
FIG. 4 is an example computer system useful for implementing various embodiments.

Various embodiments can be implemented, for example, using one or more well-known computer systems, such as computer system 400 shown in FIG. 4. Computer system 400 can be any well-known computer capable of performing the functions described herein, such as computers available from International Business Machines, Apple, Sun, HP, Dell, Sony, Toshiba, etc.

Computer system 400 includes one or more processors (also called central processing units, or CPUs), such as a processor 404. Processor 404 is connected to a communication infrastructure or bus 406.

Computer system 400 also includes user input/output device(s) 403, such as monitors, keyboards, pointing devices, etc., which communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 4. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method for generating development infrastructure, comprising:
decomposing a development process into one or more functional requirements, the functional requirements corresponding to one or more functional capabilities;
mapping each functional requirement of the decomposed development process to the one or more corresponding functional capabilities;
determining a first value for a first set of services based on a quantity of functional capabilities satisfying each functional requirement relative to a quantity of functional capabilities not satisfying any functional requirement;
determining a second value for a second set of services based on a quantity of functional capabilities satisfying each functional requirement relative to a quantity of functional capabilities not satisfying any functional requirement;
ranking the first value and the second value according to which set of services minimizes a total quantity of functional capabilities not associated with any functional requirement while still satisfying each functional requirement; and
selecting the set of services that minimizes the total quantity of functional capabilities not associated with any functional requirement while still satisfying each functional requirement.

2. The method of claim 1, further comprising:
incorporating into the development infrastructure an optimal selection of services, the optimal selection of services being the selection that satisfies each functional requirement while minimizing the quantity of functional capabilities not satisfying any functional requirement.

3. The method of claim 1, the decomposing further comprising:
identifying one or more sub-processes associated with each development process; and
mapping each sub-process to a corresponding entry in a development process catalog, each entry in the development process catalog defined by one or more functional requirements.

4. The method of claim 3, wherein the development process catalog comprises one or more indices of standardized development sub-processes, the indices including a cross-reference to one or more standardized functional requirements associated with each standardized development sub-process.

5. The method of claim 1, the mapping further comprising:
scanning a development infrastructure services catalog, the development infrastructure services catalog comprising one or more services associated with one or more functional capabilities; and
identifying a matching functional capability for each functional requirement, wherein each functional capability is associated with one or more services.

6. The method of claim 5, wherein the development infrastructure services catalog comprises one or more indices of standardized functional capabilities, the indices including a cross-reference to one or more services associated with each standardized functional capability.

7. A system, comprising:
a memory; and
at least one processor coupled to the memory and configured to:
decompose a development process into one or more functional requirements, the functional requirements corresponding to one or more functional capabilities;
map each functional requirement of the decomposed development process to the one or more corresponding functional capabilities;
determine a first value for a first set of services based on a quantity of functional capabilities satisfying each functional requirement relative to a quantity of functional capabilities not satisfying any functional requirement;

determine a second value for a second set of services based on a quantity of functional capabilities satisfying each functional requirement relative to a quantity of functional capabilities not satisfying any functional requirement;

rank the first value and the second value according to which set of services minimizes a total quantity of functional capabilities not associated with any functional requirement while still satisfying each functional requirement; and select the set of services that minimizes the total quantity of functional capabilities not associated with any functional requirement while still satisfying each functional requirement.

8. The system of claim 7, the at least one processor further configured to:

incorporate into the development infrastructure an optimal selection of services, the optimal selection of services being the selection that satisfies each functional requirement while minimizing the quantity of functional capabilities not satisfying any functional requirement.

9. The system of claim 7, the at least one processor when configured to decompose further configured to:

identify one or more sub-processes associated with each development process; and map each sub-process to a corresponding entry in a development process catalog, each entry in the development process catalog defined by one or more functional requirements.

10. The system of claim 9, wherein the development process catalog comprises one or more indices of standardized development sub-processes, the indices including a cross-reference to one or more standardized functional requirements associated with each standardized development sub-process.

11. The system of claim 7, the at least one processor when configured to map further configured to:

scan a development infrastructure services catalog, the development infrastructure services catalog comprising one or more services associated with one or more functional capabilities; and identify a matching functional capability for each functional requirement, wherein each functional capability is associated with one or more services.

12. The method of claim 11, wherein the development infrastructure services catalog comprises one or more indices of standardized functional capabilities, the indices including a cross-reference to one or more services associated with each standardized functional capability.

13. A non-transitory computer-readable medium having instructions stored thereon that, when executed by at least one computing device, causes the at least one computing device to perform operations comprising:

decomposing a development process into one or more functional requirements, the functional requirements corresponding to one or more functional capabilities;

mapping each functional requirement of the decomposed development process to the one or more corresponding functional capabilities;

determining a first value for a first set of services based on a quantity of functional capabilities satisfying each functional requirement relative to a quantity of functional capabilities not satisfying any functional requirement;

determining a second value for a second set of services based on a quantity of functional capabilities satisfying each functional requirement relative to a quantity of functional capabilities not satisfying any functional requirement;

ranking the first value and the second value according to which set of services minimizes a total quantity of functional capabilities not associated with any functional requirement while still satisfying each functional requirement; and selecting the set of services that minimizes the total quantity of functional capabilities not associated with any functional requirement while still satisfying each functional requirement.

14. The computer-readable device of claim 13, the operations further comprising:

incorporating into the development infrastructure an optimal selection of services, the optimal selection of services being the selection that satisfies each functional requirement while minimizing the quantity of functional capabilities not satisfying any functional requirement.

15. The computer-readable device of claim 13, the operations when decomposing further comprising:

identifying one or more sub-processes associated with each development process; and mapping each sub-process to a corresponding entry in a development process catalog, each entry in the development process catalog defined by one or more functional requirements.

16. The computer-readable device of claim 15, wherein the development process catalog comprises one or more indices of standardized development sub-processes, the indices including a cross-reference to one or more standardized functional requirements associated with each standardized development sub-process.

17. The computer-readable device of claim 13, the operations when mapping further comprising:

scanning a development infrastructure services catalog, the development infrastructure services catalog comprising one or more services associated with one or more functional capabilities; and identifying a matching functional capability for each functional requirement, wherein each functional capability is associated with one or more services.

18. The computer-readable device of claim 17, wherein the development infrastructure services catalog comprises one or more indices of standardized functional capabilities, the indices including a cross-reference to one or more services associated with each standardized functional capability.

* * * * *